United States Patent
Kaneko et al.

(10) Patent No.: US 11,578,783 B2
(45) Date of Patent: Feb. 14, 2023

(54) ACTUATOR AND PLANETARY GEAR APPARATUS WITH UNEVEN CROWNING

(71) Applicant: ENPLAS CORPORATION, Kawaguchi (JP)

(72) Inventors: Takuya Kaneko, Kawaguchi (JP); Toshiki Kawada, Kawaguchi (JP)

(73) Assignee: ENPLAS CORPORATION, Kawaguchi (JP)

( * ) Notice: Subject to any disclaimer, the term of this patent is extended or adjusted under 35 U.S.C. 154(b) by 47 days.

(21) Appl. No.: 17/132,587

(22) Filed: Dec. 23, 2020

(65) Prior Publication Data

US 2021/0199178 A1  Jul. 1, 2021

(30) Foreign Application Priority Data

Dec. 27, 2019  (JP) .............................. JP2019-239509

(51) Int. Cl.
*F16H 1/28* (2006.01)
*F16H 1/32* (2006.01)

(52) U.S. Cl.
CPC .............. *F16H 1/32* (2013.01); *F16H 1/2818* (2013.01); *F16H 2001/327* (2013.01)

(58) Field of Classification Search
CPC .... F16H 1/32; F16H 1/2818; F16H 2001/327; F16H 57/0006; F16H 2055/176; F16H 57/08

See application file for complete search history.

(56) References Cited

U.S. PATENT DOCUMENTS

| | | | | |
|---|---|---|---|---|
| 1,864,256 A | * | 6/1932 | Nardone | F02N 19/001 192/105 CD |
| 4,674,350 A | * | 6/1987 | Zaunberger | F16D 3/185 74/411 |
| 7,621,843 B2 | * | 11/2009 | Madge | F03D 15/00 475/346 |

(Continued)

FOREIGN PATENT DOCUMENTS

| | | | |
|---|---|---|---|
| EP | 0230843 A1 | * | 8/1987 |
| GB | 298471 A | * | 5/1929 |

(Continued)

*Primary Examiner* — Sherry L Estremsky
(74) *Attorney, Agent, or Firm* — Sterne, Kessler, Goldstein & Fox P.L.L.C.

(57) ABSTRACT

Disclosed herein are actuator, planetary-gear apparatus, and structural-unit embodiments configured to reduce noise and vibration caused by operation of planetary gears. An embodiment may include a ring gear having an outer peripheral surface that extends in the axial direction. A first raised portion may be formed on said outer peripheral surface; and a housing having an inner peripheral surface that is provided facing, and with a gap from, the outer peripheral surface of the ring gear. A second raised portion may be formed on said inner peripheral surface. Movement of the ring gear in the circumferential direction is limited by linear contact or point contact between the first raised portion and the second raised portion, for example. The outer peripheral surface and/or the inner peripheral surface may be a surface of a crowned shape that is bowed in the outer radial direction, according to some further embodiments.

18 Claims, 19 Drawing Sheets

(56) References Cited

U.S. PATENT DOCUMENTS

| | | | |
|---|---|---|---|
| 7,753,821 B2 * | 7/2010 | Ueda | F16H 1/48 |
| | | | 475/331 |
| 8,864,621 B2 * | 10/2014 | Phebus | F16H 1/46 |
| | | | 475/346 |
| 11,156,286 B2 * | 10/2021 | Kawada | F16H 55/14 |

FOREIGN PATENT DOCUMENTS

| JP | S62-228737 A | | 10/1987 |
|---|---|---|---|
| JP | 63120859 A | * | 5/1988 |
| JP | H06-74835 B2 | | 9/1994 |

* cited by examiner

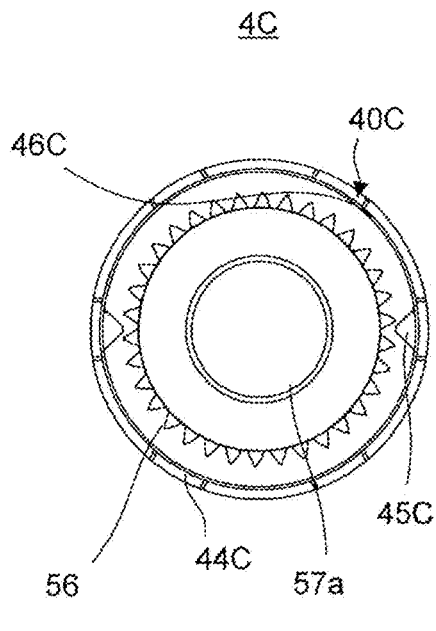 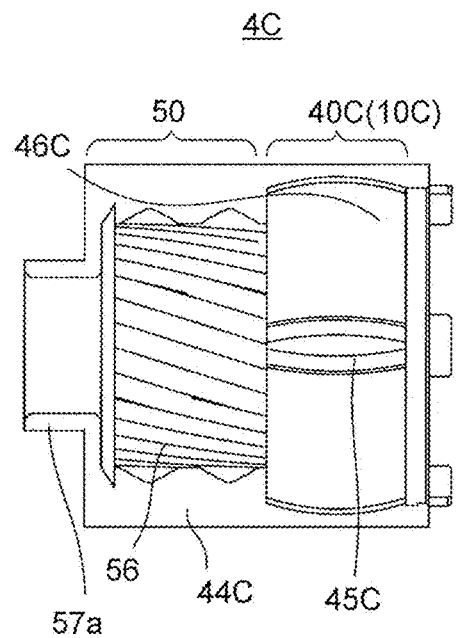
FIG. 21A  FIG. 21B
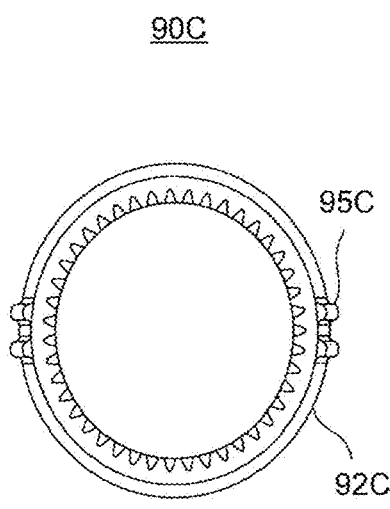 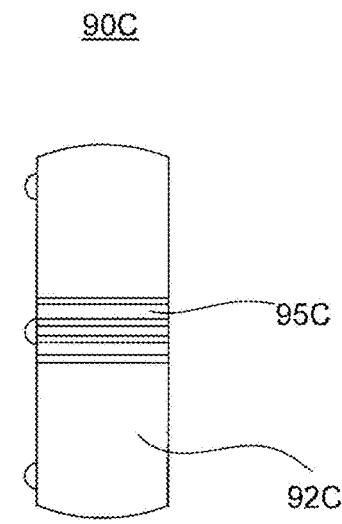
FIG. 22A  FIG. 22B

US 11,578,783 B2

1

ACTUATOR AND PLANETARY GEAR APPARATUS WITH UNEVEN CROWNING

FIELD OF TECHNOLOGY

The present disclosure relates to a structural unit, a planetary gear apparatus, and an actuator.

BACKGROUND

Planetary gear apparatuses are used in a variety of technologies, such as automobiles, robots, and the like, as decelerating mechanisms for decelerating and outputting inputted rotation. Because planetary gear apparatuses are structured through combining a plurality of gears, noise and vibration is produced during operation. Technologies have been proposed for suppressing noise and vibration produced during operation of such planetary gear apparatuses.

As such a technology that has been proposed, Patent Document 1 (cited below) discloses a planetary gear apparatus that is structured with a gap between the ring gear and the housing, to separate therebetween. The use of a structure wherein a ring gear and a housing are separated will cause less vibration to be transmitted from the ring gear to the housing, so that less noise will be produced through the vibration.

CITED REFERENCE

Patent Document 1 Japanese Examined Patent Application Publication H06-074835

SUMMARY

Problem Solved

In the planetary gear apparatus according to Patent Document 1, the structure is in a shape wherein the outer peripheral surface of the ring gear and the inner peripheral surface of the housing fit together. Because of this, when the ring gear moves during operation of the planetary gear apparatus, the outer peripheral surface of the ring gear and the inner peripheral surface of the housing will make contact in a range that is somewhat wide.

Through this, in a state wherein there is contact between the ring gear and the housing, the vibration of the planetary gear mechanism that propagates to the ring gear will tend to be transmitted to the housing, and thus there is a problem in that the planetary gear apparatus will also tend to produce noise.

In particular, preferably the production of vibration and noise is suppressed when there is imprecision in the alignment, such as tilt, between the axis of the housing and the axis of the carrier that supports the planetary gear that meshes with the ring gear, due to manufacturing tolerances in the components, including the various gears, and tolerance when assembly.

An object of the present disclosure is to solve problem areas such as set forth above, to provide a structural unit, a planetary gear apparatus, and an actuator able to suppress transmission of vibration from the gear mechanism and suppress noise that is produced by the planetary gear apparatus.

Means for Solving the Problem

One form of a structural unit according to the present disclosure comprises: a ring gear (e.g., inner gear, or similar

2 element including gear teeth extending inward) having an outer peripheral surface that extends in the axial direction, such that a first raised portion is formed on said outer peripheral surface; and a housing having an inner peripheral surface that is provided facing, and with a gap from, the outer peripheral surface of the ring gear, such that a second raised portion is formed on said inner peripheral surface. Movement of the ring gear in the circumferential direction may be limited by linear contact or point contact between the first raised portion and the second raised portion. The outer peripheral surface and/or the inner peripheral surface may have a crowned shape that is bowed in the outer radial direction.

One form of a planetary gear apparatus according to the present disclosure comprises: a structural units as set forth above; one or more planetary gears that mesh with the ring gear; a sun gear that meshes with the one or more planetary gears, positioned at the center of the one or more planetary gears; and a carrier that supports the one or more planetary gears rotatably.

One form of an actuator according the present disclosure comprises: a planetary gear apparatus as set forth above; and a motor, connected to the planetary gear apparatus, for driving the planetary gear apparatus.

Effects

The present disclosure enables suppression transmission of vibration from a gear mechanism, and suppression of noise produced by a planetary gear apparatus.

BRIEF DESCRIPTIONS OF THE DRAWINGS

FIG. 21A is a front view of the housing main unit of the structural unit of the third modified example, viewed from one side in the axial direction, and FIG. 21B is a longitudinal sectional drawing, sectioned along the axial direction of this housing main unit.

FIG. 22A is a front view of a ring gear of the third modified example of a structural unit according to an embodiment according to the present disclosure, viewed from one side in the axial direction, and FIG. 22B is a side view of the ring gear of FIG. 22A.

FORMS FOR CARRYING OUT THE PRESENT DISCLOSURE

Embodiments according to the present disclosure are explained in further detail below, based on the drawings.

Figure 1:
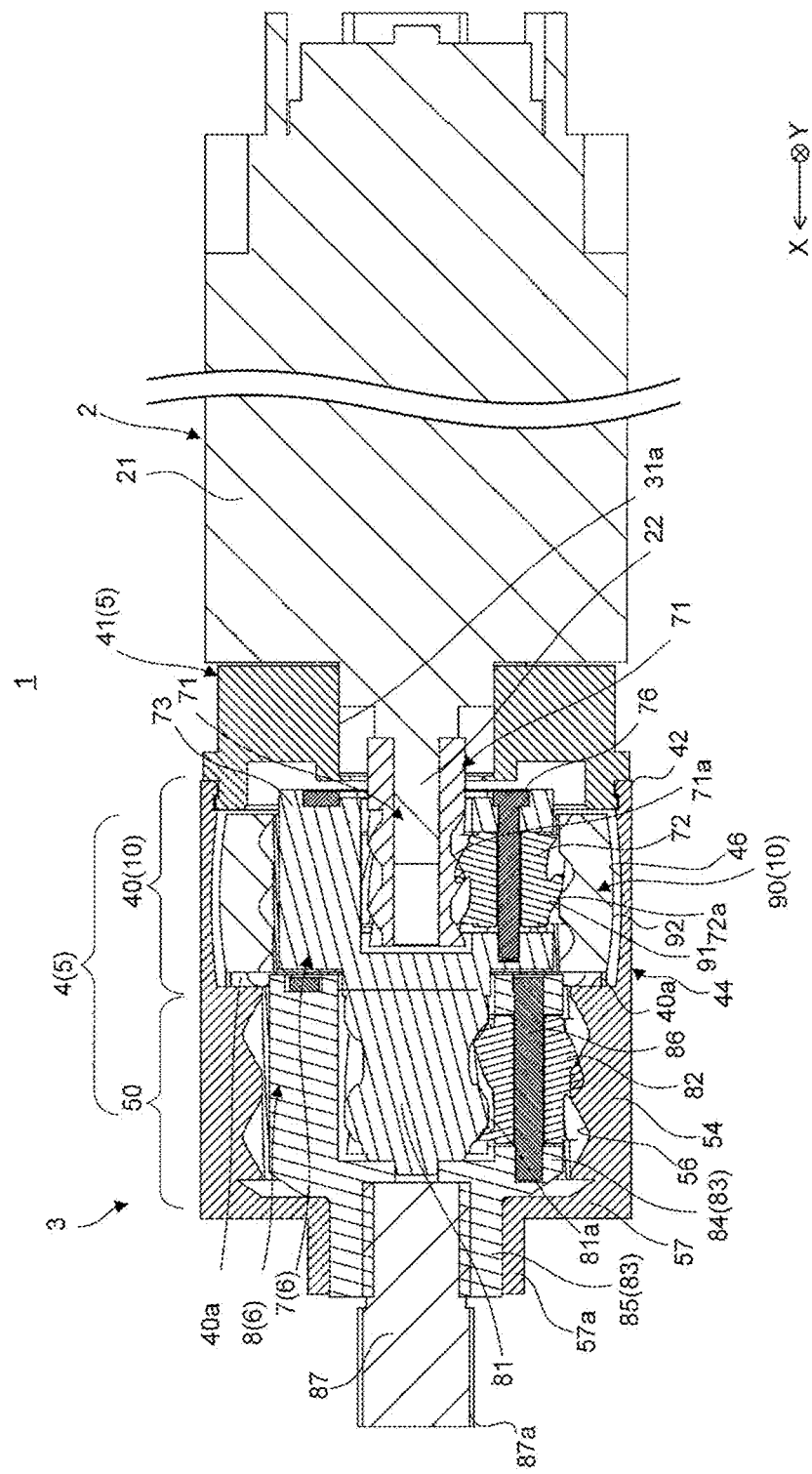
FIG. 1 is a longitudinal sectional drawing along the axial direction of an actuator that includes a planetary gear apparatus that has a structural unit according to an embodiment according to the present disclosure.

FIG. 1 is a longitudinal sectional drawing, sectioned the axial direction, of an actuator that includes a planetary gear apparatus having a structural unit according to an embodiment according to the present disclosure. Note that the planetary gear apparatus and actuator according to the embodiment set forth below is an example of a planetary gear apparatus and an actuator according to the present disclosure; the present disclosure is not limited to the embodiment set forth below. In the explanation below, the crosswise direction in FIG. 1 shall be termed the "X direction" or "axial direction," where the direction to the left shall be termed the "+X direction," and the direction toward the right shall be termed the "−X direction." Moreover, in FIG. 1, the directions perpendicular to the X axis shall be termed the "Y direction," or the "radial direction," where the radial direction toward the outside shall be termed the "+Y direction," and the radial direction toward the inside shall be termed the "—Y direction." Moreover, in FIG. 1 the direction around the X axis shall be termed the "circumferential direction." Specifically, in the housing 5 in FIG. 1, the side of the housing main unit 4 that is open so as to enable attachment of a connecting cover unit 41 shall be termed the "one side" (the −X-direction side), and the opposite side, which is the side that has the opening 57a of the opening/closing portion 57 of the housing main unit 4, shall be termed the "other side" (the +X-direction side). However, the present disclosure is not limited thereto, and instead the side of the housing main unit 4 that has the opening 57a of the opening/closing portion 57 may be read as being the "one side," and the side of the housing main unit 4 that is open to enable attachment of the connecting cover unit 41 may be read as being the "other side."

An actuator 1, a planetary gear apparatus 3 that is included in the actuator 1, and a structural unit 10 that is provided with the planetary gear apparatus 3, according to a first embodiment, is explained in reference to FIG. 1.

Structure of the Actuator

The actuator depicted in FIG. 1 is used as an actuator 1 for an electric back door of an automobile, for example. Note that there is no particular limitation on the application for the actuator 1.

The actuator 1 has a motor (electric motor) 2 and a planetary gear apparatus 3 that is connected to the motor 2.

Motor

The motor 2 has a motor main unit 21, and a rotary shaft 22. The motor 2 operates under the control of a controlling portion (not shown) to rotate the rotary shaft 22, to drive the planetary gear apparatus 3.

Overall Structure of the Planetary Gear Apparatus 3

The planetary gear apparatus 3 decelerates, by a prescribed reduction ratio, the rotation that is inputted by the motor 2, to output this rotation from an output shaft 87.

The planetary gear apparatus 3 comprises, for example: a housing 5 that has a connecting cover unit 41 and a housing main unit 4; and a planetary gear mechanism 6 that is contained in the interior of the connecting cover unit 41 and the housing main unit 4. The planetary gear mechanism 6 has, for example, a plurality of planetary gear mechanisms (a first planetary gear mechanism 7 and a second planetary gear mechanism 8) that are arranged along the axial direction, and an output shaft 87.

Housing 5

In the housing 5, in the present embodiment, a plurality of planetary gear mechanisms 7 and 8, connected as the planetary gear mechanism 6, is contained by the connecting cover unit 41 and the housing main unit 4, to achieve multistage deceleration. In the housing 5, the planetary gear mechanism 6 decelerates, in two stages, the rotation of the rotary shaft 22 that is driven by the motor 2, to output the rotation from the output shaft 87.

Connecting Cover Unit 41

The connecting cover unit 41 is, for example, a member for attaching the motor 2 to the planetary gear apparatus 3. Moreover, the connecting cover unit 41 is combined with the housing main unit 4 to form a housing space for housing the planetary gear mechanism 6 in the interior thereof. An opening 31a, through which the rotary shaft 22 of the motor 2 passes, is formed in the center of the connecting cover unit 41. The rotary shaft 22 that passes through the opening 31a is secured to a sun gear 71, described below, of the planetary gear mechanism 6. The connecting cover unit 41 is made from, for example, a synthetic resin, formed through injection molding.

Housing Main Unit 4

As illustrated in FIG. 1, for example, the housing main unit 4 is open on one side (the −X-direction side) in the axial direction to enable attachment of the connecting cover unit 41, where the planetary gear mechanism 6 is placed inside through this open part.

The housing main unit 4 has a first housing element 40, wherein the first planetary gear mechanism 7 is housed, and a second housing element 50, wherein the second planetary gear mechanism 8 is housed and from which the output shaft 87 of the second planetary gear mechanism 8 protrudes to the outside. Note that the housing main unit 4, and specifically the first housing element 40 and the second housing element 50, is made from, for example, a synthetic resin, formed through injection molding.

The first housing element 40 houses a ring-shaped first ring gear 90 that is provided so as to encompass a sun gear 71 and a plurality of planetary gears 72, described below. The second housing element 50 has a ring-shaped second ring gear portion 56 that is provided so as to encompass a sun gear 81 and a plurality of planetary gears 82, described below.

The first housing element 40 is an example of the "housing" of the structural unit 10 in the present disclosure. The first housing element 40, along with a first ring gear 90 that functions as a portion of the first planetary gear mechanism 7 that is housed by the first housing element 40, structures the structural unit 10.

First Housing Element 40

Figure 2:
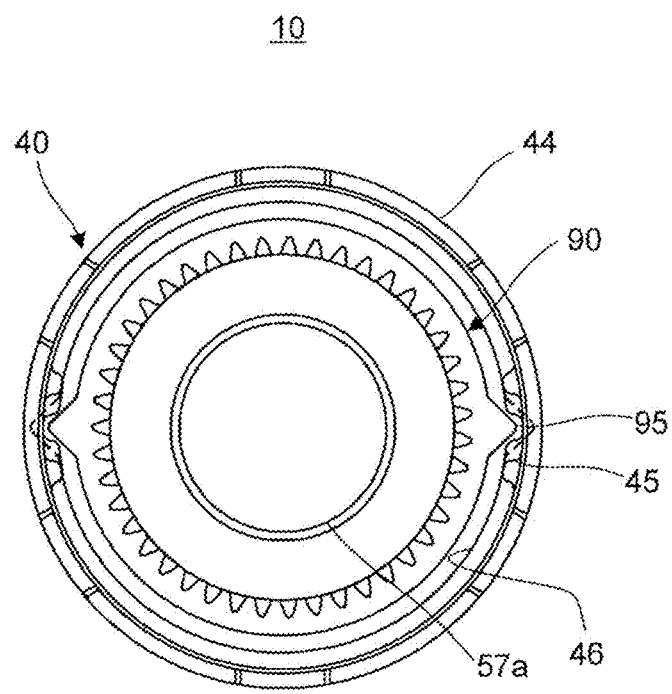
FIG. 2 is a front view of a structural unit, viewed from one side in the axial direction.
Figure 3:
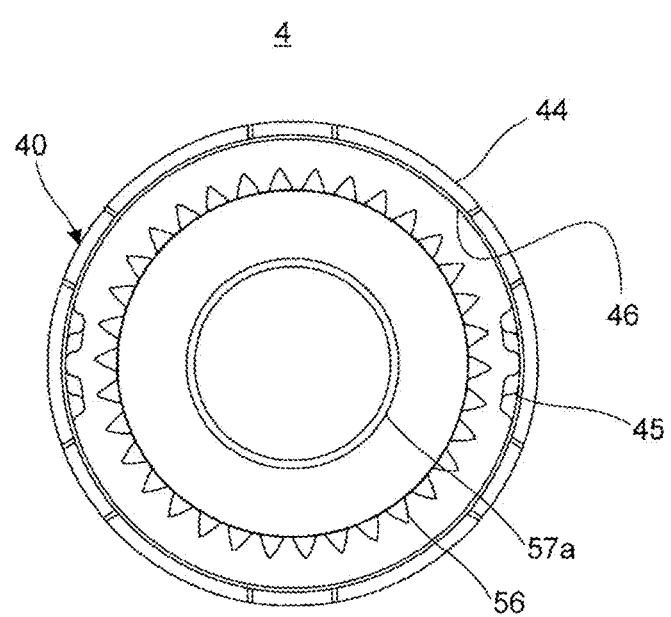
FIG. 3 is a front view of a housing main unit of this structural unit, viewed from one side in the axial direction.
Figure 4:
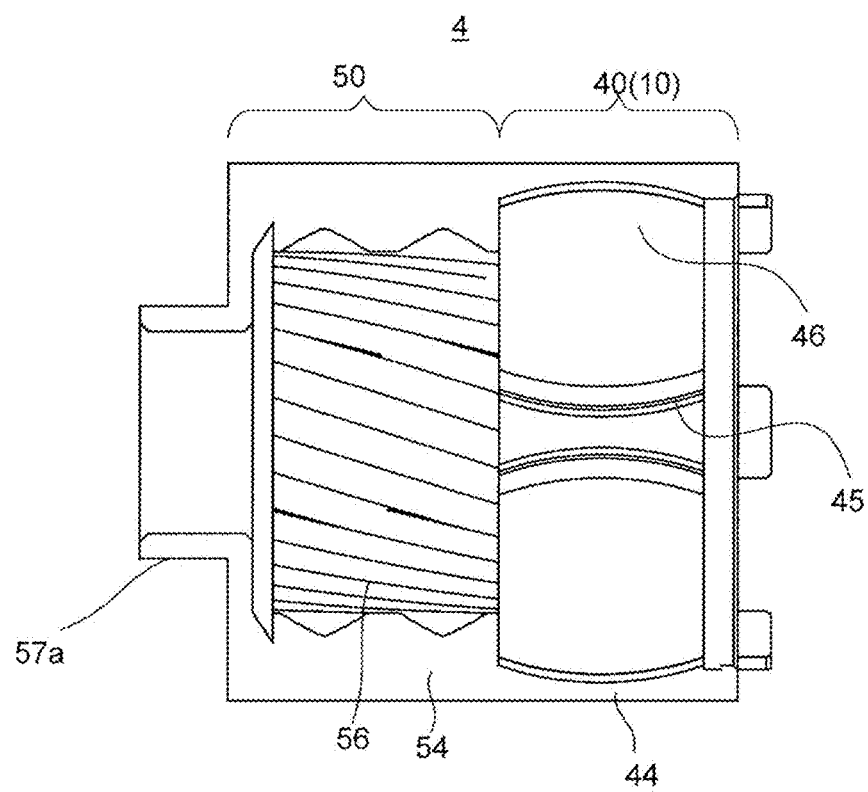
FIG. 4 is a longitudinal sectional drawing along the axial direction the housing main unit of this structural unit.
Figure 5:
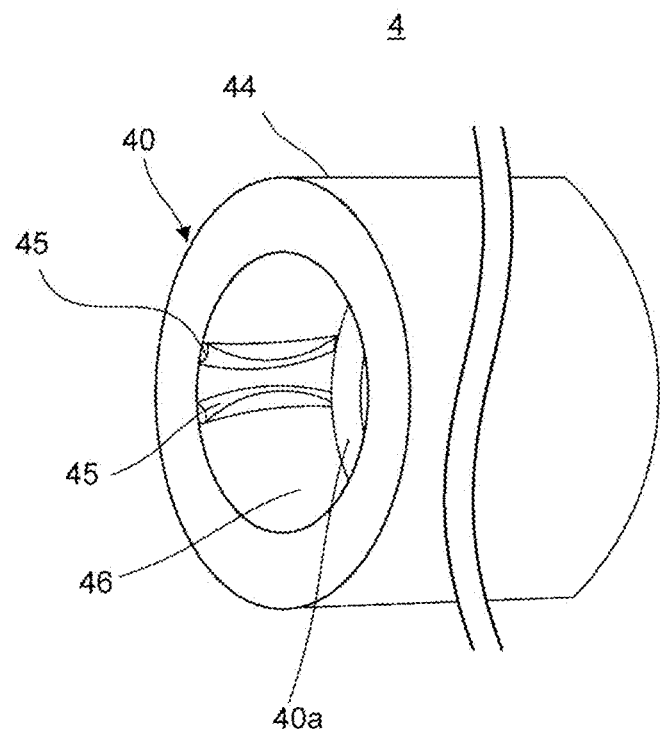
FIG. 5 is a perspective diagram showing a first housing element of the housing main unit.

The first housing element 40, as a housing in the structural unit 10 according to an embodiment of the present disclosure, is explained in reference to FIG. 2 through FIG. 5. FIG. 2 is a front view of a structural unit, viewed from one side (the −X-direction side) in the axial direction, and FIG. 3 is a front view of the housing main unit of this structural unit, viewed from one side in the axial direction. FIG. 4 is a longitudinal sectional drawing, sectioned along the axial direction of the housing main unit. FIG. 5 is a perspective diagram depicting the first housing element.

The first housing element 40 is a cylindrical body that is open on one side (the −X-direction side), provided in connection with the second housing element 50 at an opening end face portion 40a of the other side (the +X-direction side). In the present embodiment, the first housing element 40 and the second housing element 50 are formed as a single unit, where the hollow interiors thereof are in communication with each other, to structure a space for housing the planetary gear mechanism 6.

The first housing element 40 in the present embodiment, as illustrated in FIG. 1 through FIG. 5, has a first cylinder 44 that has an inner peripheral surface 46 that faces an outer peripheral surface 92 of a first ring gear 90, with a gap therebetween. Second raised portions 45, which function as stoppers, are formed on the inner peripheral surface 46.

The first housing element 40 limits movement of the first ring gear 90 in the circumferential direction through contact between the second raised portions 45 and first raised portions 95 of the first ring gear 90, and houses the first ring gear 90 in a floating state (a state wherein movement as possible in all directions).

The first housing element 40, through contact between the second raised portions 45 and the first raised portions 95, through point contact or linear contact thereof, supports the first ring gear 90 so as to enable movement thereof so that the axis of the first ring gear 90 can incline in respect to the axis of the first housing element 40. For example, the first housing element 40 contains the first ring gear 90 so as to enable easy movement, such as pitching and rolling, within the first cylinder 44.

The first cylinder 44 is provided integrally with a second cylinder 54. The outer peripheral surface of the first cylinder 44 structures the outer peripheral surface of the second housing element 50 and also the outer peripheral surface of the housing main unit 4.

The first cylinder 44 is provided so as to encompass the first ring gear 90, in addition to the sun gear 71, the planetary gears 72, and the carrier 73 that structure the first planetary gear mechanism 7. The first cylinder 44 has an inner peripheral surface 46 that encompasses the sun gear 71, the planetary gear 72, the carrier 73, and the first ring gear 90.

An engaging portion 42, for securely engaging with the connecting cover unit 41, is provided on the opening edge portion on the one side of the first cylinder 44. In the present embodiment, the engaging portion 42 is tab portions that protrude from the opening edge portion spaced with prescribed intervals in the circumferential direction. The tab portions engage with an engaged portion, provided in the connecting cover unit 41, to limit the relative movement between the connecting cover unit 41 and the housing main unit 4 in the axial direction and the circumferential direction.

The inner peripheral surface 46 of the first cylinder 44 is provided corresponding to the outer peripheral surface 92 of the first ring gear 90 so as to enable the first ring gear 90, described below, to rotate. The inner peripheral surface 46 is of a shape that enables relative movement with the outer peripheral surface 92 of the first ring gear 90. In the present embodiment, the inner peripheral surface 46 is a surface of a crowned shape (which may be abbreviated as a "crowned surface," below) that is bowed so as to be recessed in the outer radial direction. The inner peripheral surface 46 is formed so as to be recessed in the radial direction, into the axial-direction center part, disposed with a prescribed gap from the outer peripheral surface 92 of the ring gear 90. Note that the shape of the inner peripheral surface 46 may instead be defined by the relationship with the outer peripheral surface 92 of the ring gear 90, described below in detail. The inner peripheral surface 46 and/or the outer peripheral surface 92 is/are formed in a crowned shape.

The second raised portions 45 contact the first raised portions 95 of the first ring gear 90 that is contained within the first cylinder 44, to limit movement of the first ring gear 90 in at least the circumferential direction.

In the present embodiment, the second raised portions 45 are formed on the inner peripheral surface 46, extending along the axial direction (from the one side toward the other side in the axial direction).

As illustrated in FIG. 4 and FIG. 5, the second raised portions 45 are provided with the tip portions, positioned on the inside in the radial direction, bowed so as to produce a shape that bulges to the side wherein the first raised portions 95 are positioned, formed so as to enable point contact or linear contact with the first raised portions 95.

In the present embodiment, the second raised portions 45, as illustrated in FIG. 2 through FIG. 4, are disposed in pairs, in the circumferential direction, on portions of the inner peripheral surface 46 of the first cylinder 44. The first raised portions 95 of the first ring gear 90, described below (referencing FIG. 6, FIG. 7, in FIG. 9), are inserted between these pairs of second raised portions 45, where movement of the first ring gear 90 within the first housing element 40 is limited through contact with these second raised portions 45.

In the present embodiment, the second raised portions 45 each has a peaked cross-sectional shape, when sectioned by a cross-section that is perpendicular to the axial direction, and have tip portions that extend along the axial direction with a constant height of protrusion from the inner peripheral surface 46. The tip portions are formed in bulging shapes that protrude toward each other, in the direction in which they face each other in the circumferential direction, in the axial-direction center parts thereof. That is, the tip portions of the second raised portions 45 that form pairs are bowed so as to form bulging shapes toward the sides wherein the first raised portions 95 are positioned, in the circumferential direction, so that the spacing between the tip portions of the second raised portions 45 may be narrower in the axial-direction center portions than at the axial-direction end portions.

Note that the second raised portions 45 are not necessarily formed in pairs. Note that in the present embodiment and in the first through fifth modified examples, described below, the second raised portions 45 may be of any shape insofar as the shape makes point contact or linear contact, in the circumferential direction, with the first ring gear 90 when the first ring gear 90 moves within the first housing element 40.

Second Housing Element 50

The second housing element 50 has a second cylinder 54 and a second ring gear portion 56 that is formed on the inner wall of the second cylinder 54. The second ring gear portion 56 is, for example, cut at an incline, with an angle in respect to the axial direction. That is, the second housing element 50 has a second ring gear portion 56 that structures, for example, a helical gear.

The opening/closing portion 57 of the housing main unit 4 has an opening 57a that forms, for example, a cylinder, for passage of the output shaft 87 of the planetary gear mechanism 6. Through this, the torque that is outputted from the output gear 87a that is provided on the tip of the output shaft 87 can be transmitted to an external mechanism. The housing main unit 4 is made from, for example, a synthetic resin, formed through injection molding.

Planetary Gear Mechanism 6

As illustrated in FIG. 1, the planetary gear mechanism 6 is housed within the housing main unit 4, to decelerate, and output from the output gear 87a of the output shaft 87, the rotation that is transmitted from the motor 2.

The planetary gear mechanism 6 has a first planetary gear mechanism 7 and a second planetary gear mechanism 8 that are arranged along the axial direction.

First Planetary Gear Mechanism 7

The first planetary gear mechanism 7 comprises a sun gear 71, a plurality of planetary gears 72 disposed around the periphery of the sun gear 71, centered thereon, a carrier 73 that supports the plurality of planetary gears 72 rotatably, and a first ring gear 90. The first planetary gear mechanism 7 may be provided with at least one planetary gear 72, and in the present embodiment is provided with three planetary gears 72.

The sun gear 71 is an "outer gear" wherein sun tooth portions 71a are formed on the outer peripheral surface thereof, and is secured to the rotary shaft 22 of the motor 2 so as to enable rotation concentrically with the rotary shaft 22. The sun gear 71 rotates, driven by the motor 2. In the present embodiment, the sun tooth portions 71a have helical teeth that are cut at an angle in respect to the axis of the sun gear 71, so the sun gear 71 of the present embodiment may be a "helical gear."

The planetary gears 72 are outer gears having planet tooth portions 72a formed on the outer peripheral surfaces thereof. The plurality of planetary gears 72 is disposed equally spaced between the sun gear 71 and the first ring gear 90, and each meshes with both the sun gear 71 and the first ring gear 90. In the present embodiment, each of the plurality of planetary gears 72 is disposed on a single circle that is centered on the axis of the first planetary gear mechanism 7, and is supported rotatably by a carrier 73. In the present embodiment, the planet tooth portions 72a have helical teeth that are cut at an angle in respect to the axis of the planetary gear 72, so the planetary gears 72 in the present embodiment may be "helical gears."

Each of the planetary gears 72 rotates around its own axis (planetary axis 76) based on rotation of the sun gear 71. Moreover, each of the planetary gears 72 revolves around the sun gear 71 based on its own rotation and on meshing with the first ring gear 90. The axis of revolution of each planetary gear 72 may be coincident with the axis of the sun gear 71.

The carrier 73 supports the planetary gears 72 rotatably. Additionally, the carrier 73 rotates based on the revolution of the planetary gears 72, where the rotation thereof is transmitted to the second planetary gear mechanism 8. Additionally, in the present embodiment, the carrier 73 is formed as a cylinder, where the planetary gears 72 are contained within housing openings (not shown) that are formed in the outer peripheral surface thereof. Each of the planetary gears 72 is supported rotatably by respective planetary axes 76 that are directed in the axial direction, within the housing openings. In the present embodiment, each planetary gear 72 is attached in a state with a portion thereof protruding in the outer radial direction from the housing opening, protruding from the outer peripheral surface of the carrier 73. The planet tooth portions 72a mesh with the inner tooth portions 91 of the first ring gear 90 thereby.

First Ring Gear (Ring Gear) 90

Figure 6:
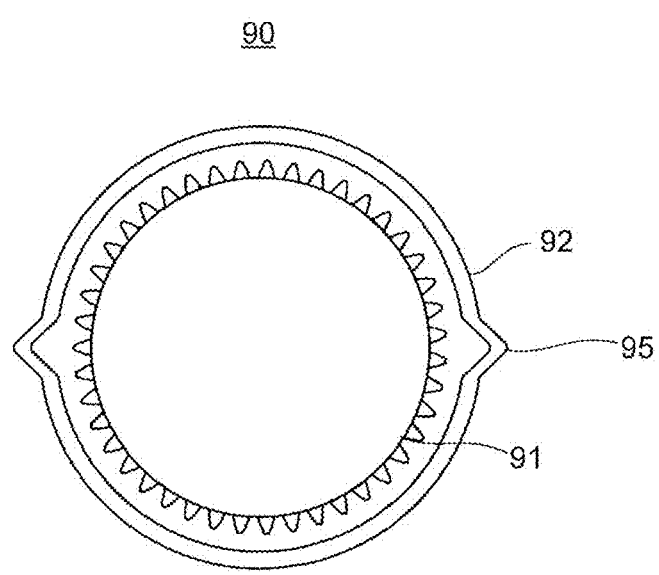
FIG. 6 is a front view of a ring gear of this structural unit, viewed from one side in the axial direction.
Figure 7:
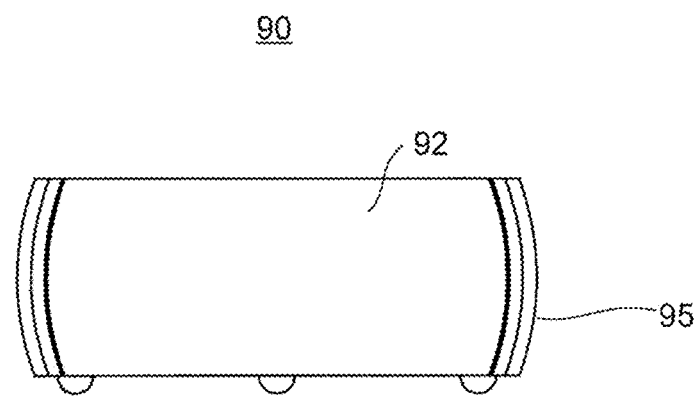
FIG. 7 is a plan view of the ring gear of this structural unit.
Figure 8:
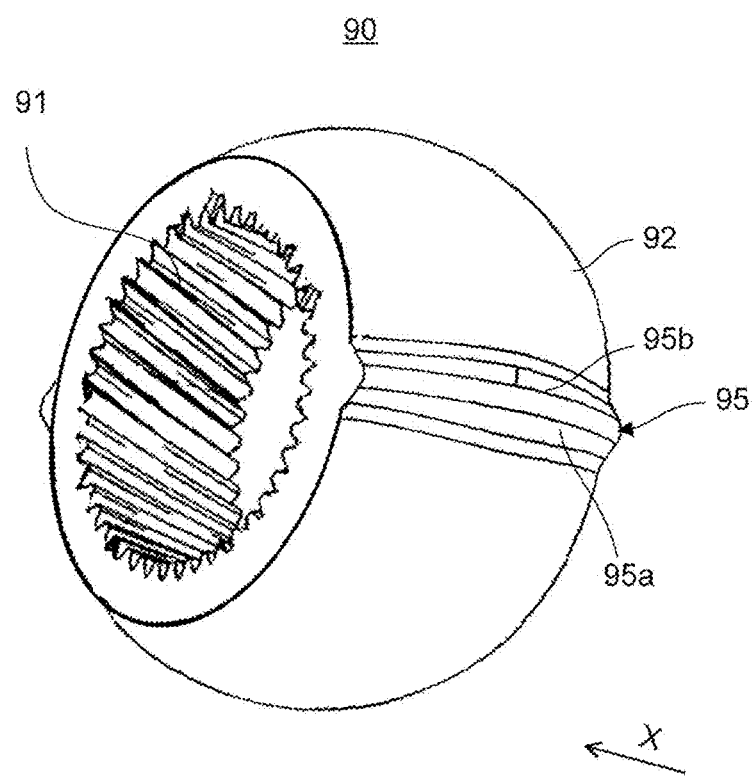
FIG. 8 is a perspective diagram of the ring gear of this structural unit.

FIG. 6 through FIG. 8 are drawings provided for explaining the first ring gear 90 that corresponds to the ring gear as the structural unit 10. Specifically, FIG. 6 is a front view of the ring gear of the structural unit, viewed from one side in the axial direction; FIG. 7 is a plan view of the ring gear of this structural unit; and FIG. 8 is a perspective diagram of the ring gear of this structural unit.

The first ring gear 90 has an inner peripheral surface and an outer peripheral surface 92 that extend in the axial direction of the first ring gear 90. Inner tooth portions 91 are formed on the inner peripheral surface. In the present embodiment, the inner tooth portions 91 form a helical gear having helical teeth that are cut at an angle in respect to the axis of the first ring gear 90. Note that the diameter of rounding of the tooth tips in the first ring gear 90 is greater than the diameter of the cylindrical carrier 73, where the carrier 73 that holds the planetary gears 72 is contained in the interior of the first ring gear 90. The planet tooth portions 72a that protrude from the outer peripheral surface of the carrier 73 are meshed with the inner tooth portions 91 of the first ring gear 90.

The outer peripheral surface 92 of the first ring gear 90 is provided corresponding to the shape of the inner peripheral surface 46 of the first cylinder 44 of the first housing element 40.

In the present embodiment, the outer peripheral surface 92 forms a surface of a crowned shape (a crowned surface) wherein the center part in the axial direction of the first ring gear 90 or in the axial direction of the output of the actuator is formed in a bulging shape to extend furthest in the outer radial direction. In the present embodiment, the outer peripheral surface 92 is formed so as to have a gap, with a substantially constant spacing along the inner peripheral surface 46 of the first cylinder 44, so as to secure a floating state. That is, the first ring gear 90 is disposed facing, with a gap therebetween, the inner peripheral surface 46, which is a crowned surface with shapes that are recessed toward the outside, in the first cylinder 44, so that the outer peripheral surface 92, which is a crowned surface with shapes that protrude toward the outside, may be loosely fitted within the first cylinder 44.

As illustrated in FIG. 2 and FIG. 6 through FIG. 8, first raised portions 95 are formed on the outer peripheral surface 92 of the first ring gear 90. The first raised portions 95 engage, in the circumferential direction, with the pairs of second raised portions 45 that are formed on the inner peripheral surface 46 of the housing main unit 4, with a gap therefrom.

In the present embodiment, the first raised portions 95 are provided corresponding to the pairs of second raised portions 45, and are inserted between the pairs of second raised portions 45.

In the present embodiment, the first raised portions 95 have cross-sectional shapes that are substantially triangular when sectioned by a plane that is perpendicular to the axial direction, and extend along the axial direction. The first raised portions 95 have positions that are bowed into bulging shapes so as to facilitate contact with the second raised portions 45 when there is movement in the circumferential direction.

The first raised portion 95 has inclined surface portions 95a that stand at angles from the outer peripheral surface 92 of the first ring gear 90, and a rounded apex 95b that is positioned at the location wherein the inclined surface portions 95a that rise from both sides intersect. The height of the first raised portion 95 corresponds to the crowned shape of the outer peripheral surface 92, where the first raised portion 95 is provided in a rib of a constant height from the outer peripheral surface 92, which is a crowned surface. The first raised portions 95 are formed so that the axial-direction center parts in the inclined surface portions 95a are wider in the circumferential direction, as depicted in FIG. 8. This facilitates the formation of a point contact or linear contact when the first raised portion 95 is inserted between a pair of second raised portions 45. Although these are formed across the entire width of the first ring gear 90, they may instead be formed across a portion thereof. The first ring gear 90 is made from, for example, a synthetic resin. Note that, as described below, the first ring gear 90 is formed from a synthetic resin of a hardness that is less than that of the synthetic resin for formation of the housing main unit 4.

The housing main unit 4 (first housing element 40) and the first ring gear 90 are physically separate, and a gap is formed between the two when the actuator 1 is not in operation. The first ring gear 90 is allowed to move within the housing main unit 4, commensurate with this gap. The first ring gear 90 being allowed to move within the housing main unit 4 means that rotation around the axial direction, that is, in the circumferential direction, and rolling in a direction that is perpendicular to the axial direction, are allowed. Given this, further movement of the first ring gear 90 in the direction around the axis is prevented through the first raised portions 95 that are formed on the first ring gear 90 contacting the pairs of second raised portions 45.

Second Planetary Gear Mechanism 8

The second planetary gear mechanism 8 decelerates with a prescribed reduction ratio, and outputs, the rotation that is transmitted from the first planetary gear mechanism 7. The second planetary gear mechanism 8 is provided further to the other side in the axial direction than the first planetary gear mechanism 7 (the left side in FIG. 1, which is the output side). The second planetary gear mechanism 8 is disposed within the housing space of the housing main unit 4, within the second housing element 50 of the housing main unit 4, and specifically at a part corresponding to the second ring gear portion 56. Note that the second planetary gear mechanism 8 may be omitted instead.

In the present embodiment, the second planetary gear mechanism comprises a sun gear 81, planetary gears 82, a carrier 83 that supports the planetary gears 82 rotatably, and an output shaft 87. The second planetary gear mechanism may comprise a single planetary gear 82, but in the present embodiment comprises three planetary gears 82.

The sun gear 81 is an "outer gear," and has sun tooth portions 81a on the outer peripheral surface thereof. In the present embodiment, the sun tooth portions 81a have helical teeth that are cut at an angle in respect to the axis of the sun gear 81, so the sun gear 81 may be a "helical gear."

In the present embodiment, the sun gear 81 is secured in a state wherein the axes are coincident with the carrier 73 of the first planetary gear mechanism 7. Through this, the sun gear 81 rotates interlocked with the rotation of the carrier 73 of the first planetary gear mechanism 7, in accordance with rotation of the carrier 73 of the first planetary gear mechanism 7. That is, the sun gear 81, accompanying rotation of the carrier 73 of the first planetary gear mechanism 7, rotates at the same rotational speed as the carrier 73 of the first planetary gear mechanism 7, in that the same rotational direction as the carrier 73 of the first planetary gear mechanism 7.

The planetary gears 82 are outer gears having planet tooth portions formed on the outer peripheral surfaces thereof. The plurality of planetary gears 82 is disposed equally spaced between the sun gear 81 and the second ring gear portion 56, and each meshes with both the sun gear 81 and the second ring gear portion 56. In the present embodiment, each of the plurality of planetary gears 82 is disposed on a single circle that is centered on the axis of the second planetary gear mechanism 8, and is supported rotatably on the planetary axis 86 of a carrier 83. In the present embodiment, the planet tooth portions have helical teeth that are cut at an angle in respect to the axis of the planetary gear 82, so the planetary gears 82 in the present embodiment may be "helical gears."

Each of the planetary gears 82 rotates around its own axis (planetary axis 86) based on rotation of the sun gear 81. Moreover, each of the planetary gears 82 revolves around the sun gear 81 based on its own rotation and on meshing with the second ring gear portion 56. The axis of revolution of each planetary gear 82 may be coincident with the axis of the sun gear 81.

The carrier 83 supports the planetary gears 82 rotatably. Additionally, the carrier 83 rotates based on the revolution of the planetary gears 82, where the rotation thereof is transmitted to the output shaft 87.

In the present embodiment, the carrier 83 has gear retaining portions 84 and an output retaining portion 85 for holding the output shaft 87.

The gear retaining portion 84 holds the planetary gears 82, and is formed as a cylinder. Housing openings (not shown) are formed on the outer peripheral surface of the gear retaining portion 84, and planetary gears 82 are housed within the housing openings. Each of the planetary gears 82 is supported rotatably by respective planetary axes 86 that are directed in the axial direction, within the housing openings. In the present embodiment, each planetary gear 82 is attached in a state with a portion thereof protruding in the outer radial direction from the housing opening, protruding from the outer peripheral surface of the carrier 83. The planet tooth portions mesh with the tooth portions of the second ring gear portion 56 thereby.

The output retaining portion 85 is provided continuously with the gear retaining portion 84 on the other side (the output side) of the gear retaining portion 84. The output retaining portion 85 is formed as a cylinder of a smaller diameter than the gear retaining portion 84, and the output shaft 87 is secured to the inside, in the radial direction, of the output retaining portion 85.

The output shaft 87 is formed in the shape of a shaft, and in the present embodiment is held on the carrier 83, to rotate together with the carrier 83. The output shaft 87 has knur-shaped teeth on the outer periphery of the end portion thereof on the output side. These teeth form an output gear on the end portion of the output shaft 87.

Operation of the Actuator 1

An example of the operation of the actuator 1 is explained below. First, when the motor 2, depicted in FIG. 1, is operating, the rotary shaft 22 rotates in a first direction or a second direction. The explanation below may be for the case of the rotary shaft 22 rotating in the first direction.

Note that in the explanation below, the first direction, in relation to the directions of rotation of the various members, means the clockwise direction when the various members are viewed from the other side (the left side in FIG. 1) in the axial direction (the direction that is parallel to the X axis). On the other hand, in the explanation below, the second direction, in relation to the directions of rotation of the various members, means the direction that is opposite to the clockwise direction when the various members are viewed from the other side (the left side in FIG. 1) in the axial direction.

When the rotary shaft 22 rotates in the first direction, the sun gear 71, in accordance with the rotation of the rotary shaft 22, rotates in the first direction. In accordance with the rotation of the sun gear 71, each of the three planetary gears 72 that mesh with the sun gear 71 rotates (spins) in the second direction, centered on its own axis (planetary axis 86). Based on the rotation of the planetary gears 72 and meshing of the planetary gears 72 and the first ring gear 90, the planetary gears 72 rotate (revolve) in the first direction, centered on the rotational axis of the sun gear 71. In accordance with the rotation (revolution) of the planetary gears 72, the carrier 73 rotates in the first direction, centered on its own axis (an axis that is coincident with the axis of the sun gear 71).

When the carrier 73 rotates in the first direction and in this way, the sun gear 81 that is secured to the carrier 73 rotates in the first direction. Accompanying rotation of the sun gear 81 in the first direction, the three planetary gears 82 that mesh with the sun gear 81 each rotates (spins) in the second direction. Additionally, the planetary gears 82, because they mesh with the second ring gear portion 56, rotate (spin) in the second direction, and, through this rotation, the planetary gears 82 rotate (revolve) in the first direction around the axis of the second planetary gear mechanism 8. Accompanying the rotation (revolution) of the planetary gears 82 in the first direction, the carrier 83 rotates in the first direction, centered on its own axis. The rotation of the carrier 83 is transmitted to the output shaft 87 that is held on the carrier 83.

While the case of the rotary shaft 22 rotating in the first direction was explained as an example of operation of the actuator 1, for a case wherein the rotary shaft 22 is rotated in the second direction, the operation of the actuator 1 may also be explained similarly, by reversing the direction of rotation of each of the gears.

As described above, with the planetary gear apparatus, in the structural unit 10 the housing main unit 4 and the first ring gear 90 are physically separated. Given this, when the actuator 1 is not operating, a gap is formed between the housing main unit 4 (the first housing element) and the first ring gear 90. When the actuator 1 is operating, the first ring gear 90 is able to rotate around the axis and able to move in a direction perpendicular to the axis, along the crowned surface within the housing main unit 4, by an amount commensurate with the gap that is provided.

When, in a position wherein the second raised portions 45 are separated from the first raised portions 95 in the circumferential direction, the first ring gear 90 is rotated in the first direction (clockwise), the first raised portions 95 that are formed on the first ring gear 90 make point contact or linear contact with the corresponding second raised portions 45 that are formed on the housing main unit 4. While this prevents the first ring gear 90 from rotating any further clockwise, the first ring gear 90 is held by the first housing element 40 of the housing main unit 4 so that the axis thereof is able to incline in respect to the axis of the housing main unit 4. Note that in the present embodiment the second raised portions 45 are formed in pairs, so that even if the first ring gear 90 were to be rotated in the second direction (counterclockwise), there may similarly be linear contact, and the first ring gear 90 may be held, with the ability to tilt, while limiting the rotation of the first ring gear 90 around the axis.

Figure 9:
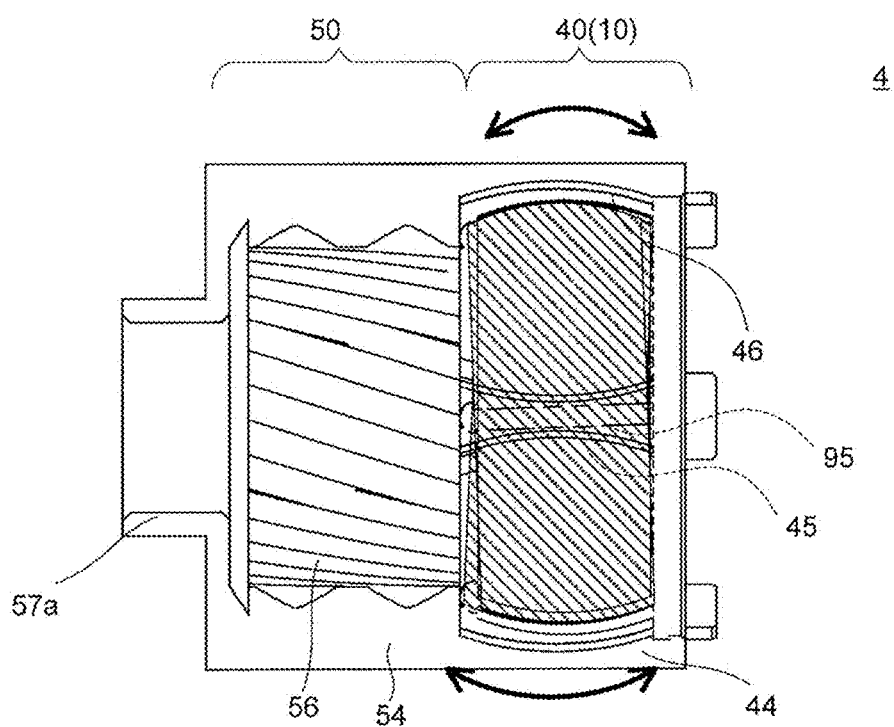
FIG. 9 is a longitudinal sectional drawing provided for explaining the operation of the structural unit that is included in the planetary gear apparatus.
Figure 10:
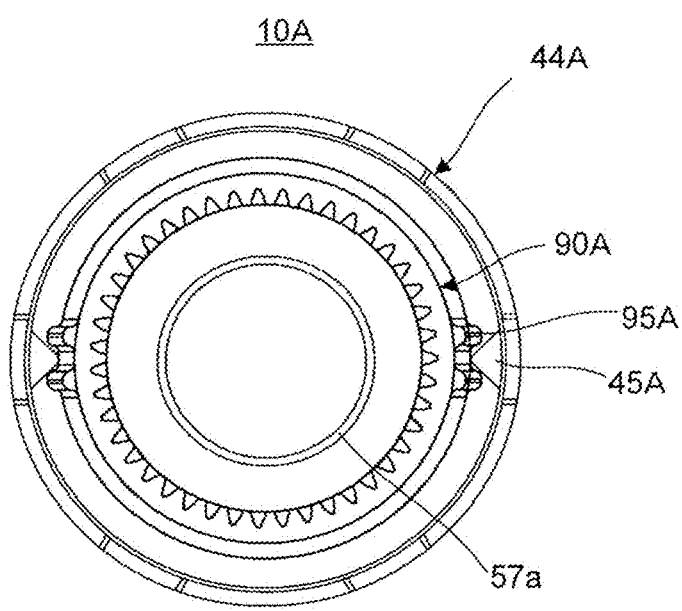
FIG. 10 is a front view, viewed from one side in the axial direction, of a first modified example of a structural unit according to an embodiment according to the present disclosure.
Figure 11:
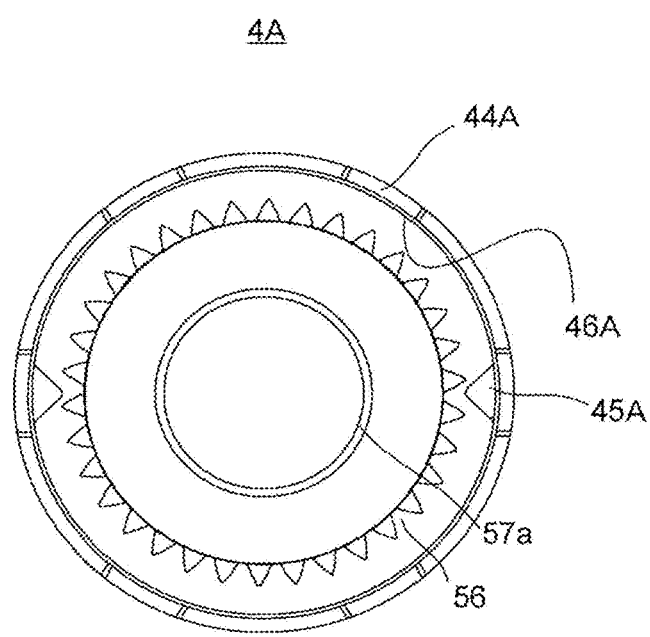
FIG. 11 is a front view of a housing main unit in the structural unit of the first modified example.
Figure 12:
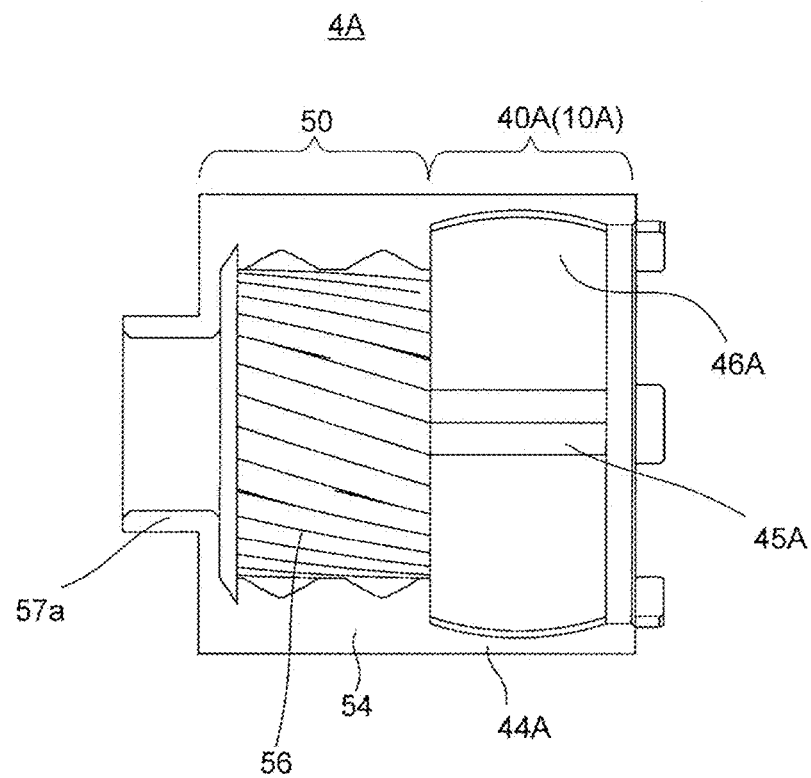
FIG. 12 is a cross-sectional diagram, sectioned along the axial direction, depicting this housing main unit.
Figure 13:
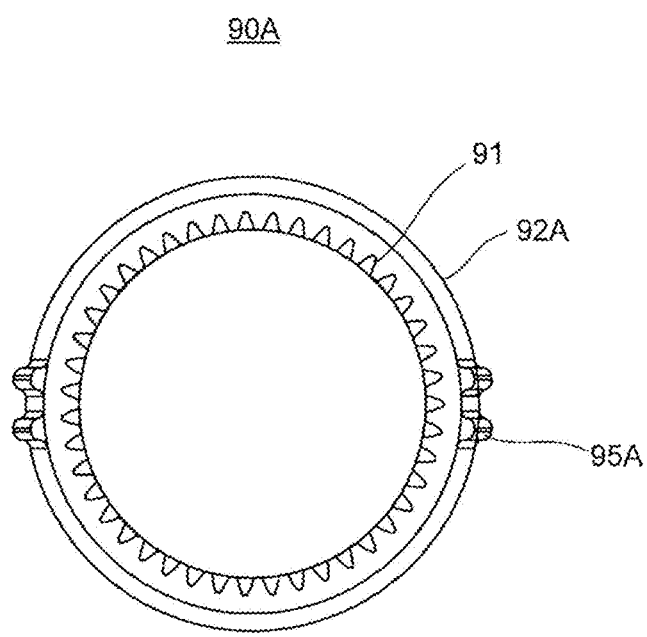
FIG. 13 is a front view of the ring gear in the structural unit of the first modified example, viewed from one side in the axial direction.
Figure 14:
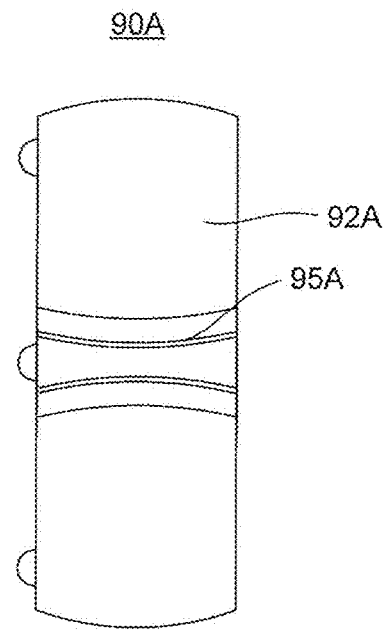
FIG. 14 is a side view depicting this ring gear.

FIG. 9 is a longitudinal sectional drawing provided for explaining the operation of the structural unit 10 that is built into the planetary gear apparatus 3. In the present embodiment, both the outer peripheral surface 92 of the first ring gear 90 and the inner peripheral surface 46 of the first cylinder 44 are crowned surfaces, enabling relative motion in all directions while being resistant to coming apart.

As illustrated in FIG. 9, when, in the present embodiment, the motor 2 is driven to actuate the planetary gear mechanism 6, the meshing of the planetary gears 82, and the like, causes the first ring gear 90 to move within the first cylinder 44 of the first housing element 40. Through this, the first raised portions 95 contact the second raised portions 45 in the circumferential direction. The first ring gear 90 is able to move in all directions, where the movement in the circumferential direction is limited through the point contact or linear contact between the first raised portions 95 and the second raised portions 45.

This makes it possible to achieve ideal meshing with the planetary gears accommodating the tilt even if the axis of the carrier 73 that supports the planetary gears 72 that mesh with the first ring gear 90 is imprecise in its alignment, such as when it is at an angle in respect to the axis of the housing main unit 4 (first housing element 40). Because of this, the present embodiment makes it possible to achieve an improvement in robustness in respect to imprecise alignment between gears, making it possible to suppress transmission of vibration from the ring gear side and to suppress the noise that is produced by the planetary gear apparatus.

Note that the synthetic resin for forming the first housing element 40 and the housing main unit 4 may be, for example, polyarylate (PAAR), polyacetal (POM), polyamide (PA), polycarbonate (PC), polybutylene terephthalate (PBT), polyether sulfone (PES), polyether ether ketone (PEEK), or the like. The synthetic resins for forming the first ring gear 90 and the first housing element 40, including the first cylinder 44, may be identical materials or may be different materials. They may be selected as appropriate in a range that produces the effects of the present disclosure. Moreover, in regard to the synthetic resin material (material) for forming the first cylinder 44 and the first ring gear 90, main components may use the same synthetic resin material and the density, or the like, of the synthetic resin is varied so that the synthetic resin for forming the first cylinder 44 may be harder, for suitable embodiments.

Modified Examples

The present disclosure is not limited to the embodiment described above, but rather a variety of modifications and applications are possible. In the embodiment described above, in the structure of the structural unit 10 that has the first housing element 40 and the first ring gear 90, both the inner peripheral surface 46 of the first cylinder 44 of the first housing element 40 and the outer peripheral surface 92 of the first ring gear 90 that is contained within the first cylinder 44 are surfaces with crowned shapes.

Here the first housing element 40 and the first ring gear 90 may use any structure insofar as the first ring gear 90 is supported so as to enable movement so that the axis of the first ring gear 90 can incline, in respect to the axis of the first housing element 40, through point contact or linear contact between the first raised portions 95 and the second raised portions 45.

Modified examples of structural units are depicted in FIG. 10 through FIG. 23, below. In the explanations of the various modified examples, the structures that are different from those of the housing main unit 4 and the first ring gear 90 is explained, and those structural elements that are identical may be assigned identical names and identical reference symbols, and explanations thereof may be omitted.

In a structural unit 10A, as a first modified example, depicted in FIG. 10 through FIG. 14, the second raised portions 45 of the first housing element (housing) 40 and the first raised portions 95 of the first ring gear 90 of the structure of the structural unit 10 are reversed. That is, the shape is such that the second raised portions 45A are inserted between pairs of first raised portions 95A.

The first ring gear 90A has an outer peripheral surface 92A that extends in the axial direction. The outer peripheral surface 92A is a crowned surface that protrudes in the outer radial direction, the same as with the first ring gear 90, and the first raised portions 95A, which are structured similarly to the second raised portions 45, extend in the axial direction on the outer peripheral surface 92A.

The tip portions of the first raised portions 95A are provided in pairs on the outer peripheral surface 92A, and the axial-direction center parts are formed in bulging shapes that bulge in directions that face each other in the circumferential direction.

On the other hand, a first housing element 40A is disposed so as to encompass the first ring gear 90A, and the first housing element 40A has an inner peripheral surface 46A that is provided with a gap, facing the outer peripheral surface 92A of the first ring gear 90A. The inner peripheral surface 46A has a crowned surface of a recessed shape that is recessed in the outer radial direction, the same as with the inner peripheral surface 46, provided in the first cylinder 44A. The inner peripheral surface 46A has second raised portions 45A that extend in the axial direction, the same as with the inner peripheral surface 46. The second raised portions 45A are provided similarly to the first raised portions 95. The second raised portions 45A in the first modified example have triangular cross-sectional shapes, formed with the same shape continuing in the axial direction.

In the first housing element 40A, when, accompanying operation of the planetary gear apparatus 3, the first ring gear 90A rotates in the circumferential direction, the second raised portions 45A enter in between the pairs of first raised portions 95A, enabling the same effects as in the structural unit 10, described above.

Moreover, in a first housing element 40B of a structural unit 10B of a second modified example, depicted in FIG. 15 through FIG. 19, the shape of the pairs of second raised portions 45, in the structure of the first housing element 40, is that of second raised portions 45B that extend parallel to each other in the axial direction. The inner peripheral surface 46B of the first cylinder 44B of the first housing element 40B is a crowned shape of a recessed shape wherein the axial-direction center portions are the furthest recessed. The second raised portions 45B are provided in pairs so as to extend with the same cross-sectional shape and the same height from the inner peripheral surface 46B, which is a crowned surface.

On their hand, when comparing the first ring gear 90B to the first ring gear 90, the outer peripheral surface does not have a crowned surface, but rather the outer peripheral surface 92B is a cylinder that is parallel to the axis. Protruding portions 95B are provided protruding in the outer radial direction, as first raised portions, in the axial-direction center part of the outer peripheral surface 92B.

The protruding portions 95B are cones, and have sharp apex portions. The protruding portions 95B are able to contact the inner peripheral surface 46B that is the crowned surface of the first housing element 40B.

Figure 15:
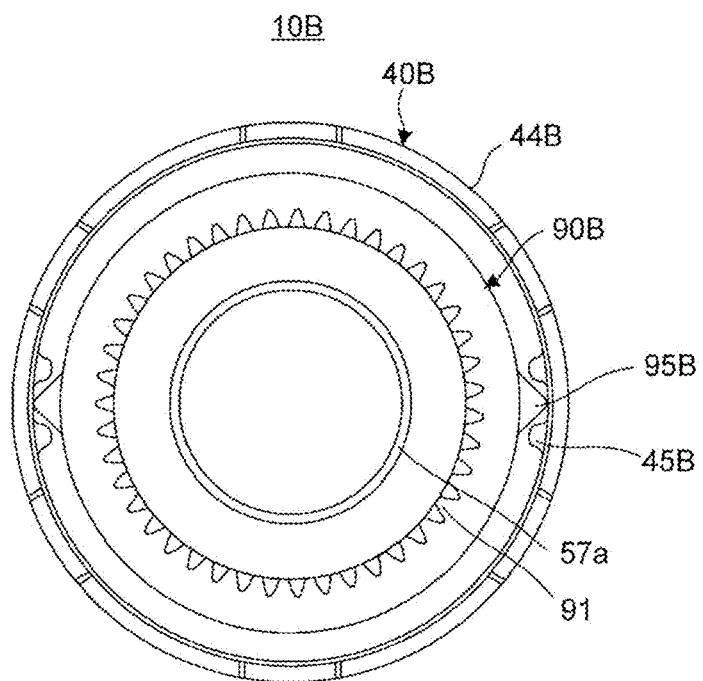
FIG. 15 is a front view of a second modified example of a structural unit according to an embodiment according to the present disclosure.
Figure 16:
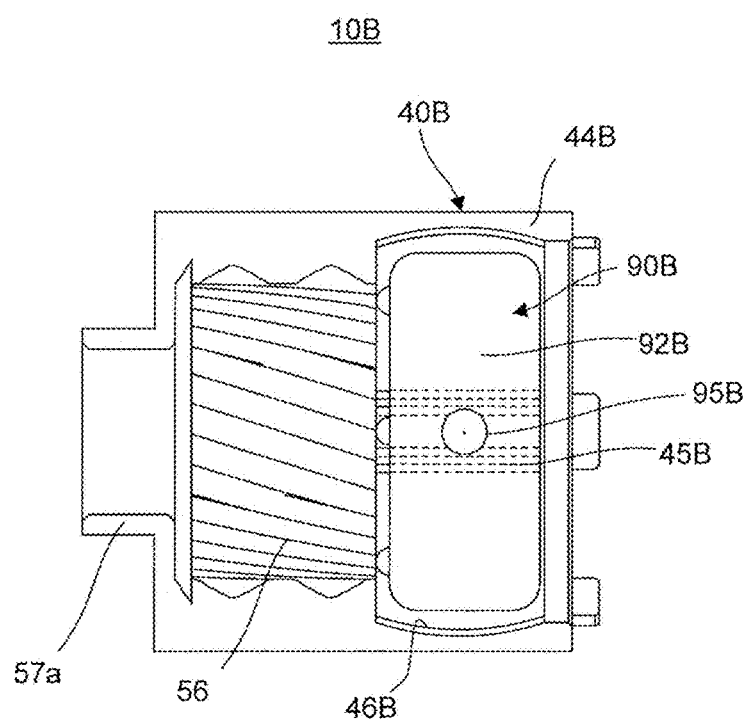
FIG. 16 is a partial cross-sectional drawing, sectioned along the axial direction of a structural unit, depicting a second modified example of a structural unit according to an embodiment according to the present disclosure.
Figure 17:
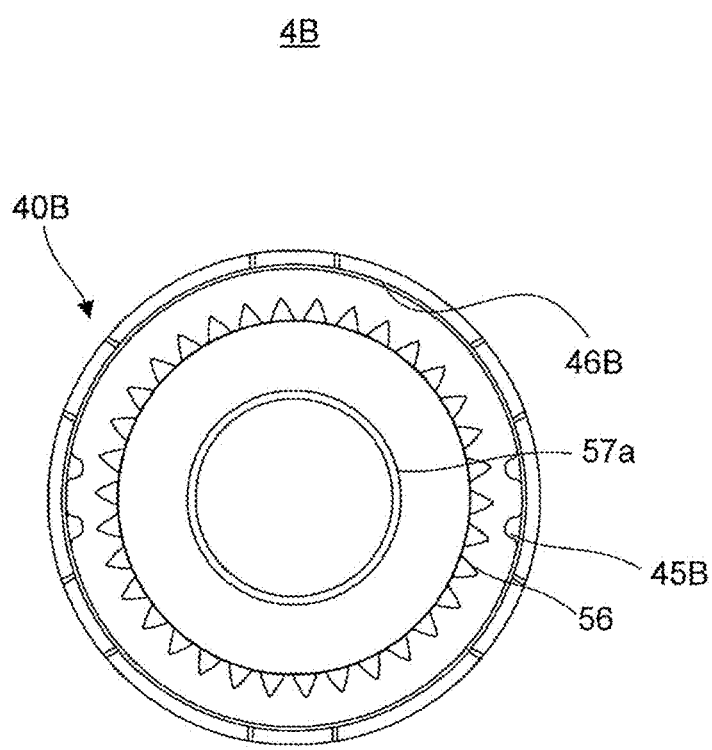
FIG. 17 is a front view of a housing main unit of the second modified example.
Figure 18:
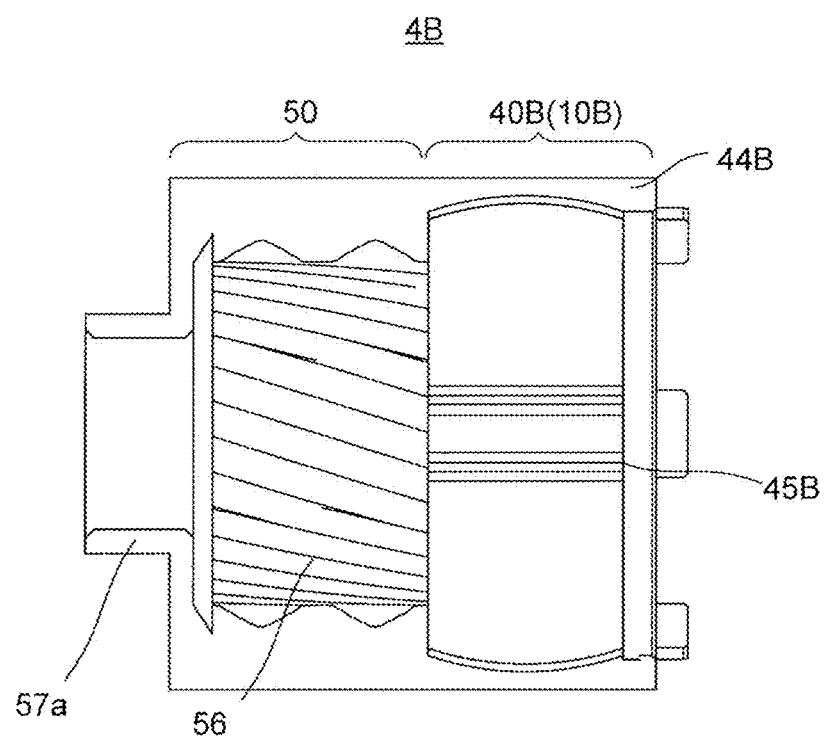
FIG. 18 is a cross-sectional drawing, sectioned along the axial direction, depicting the housing main unit of the second modified example.
Figure 19A:
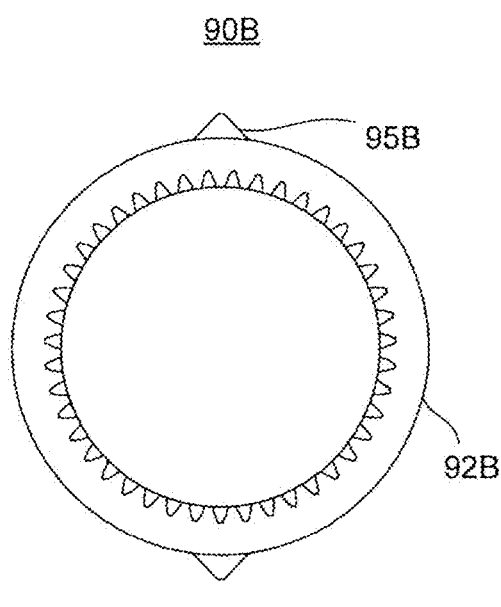
FIG. 19A is a front view, viewing the ring gear of the structural unit of the second modified example from one side.
Figure 19B:
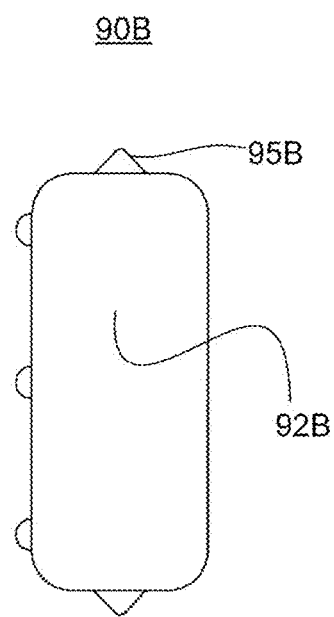
FIG. 19B is a side view of this ring gear.

Even when the structural unit 10B is in the state depicted in FIG. 15, when the first ring gear 90B is moved by operation of the planetary gear apparatus 3, the first ring gear 90B moves in the circumferential direction, and the protruding portions 95B enter in between the pairs of second raised portions 45B, and so forth, to make point contact or line contact with the second raised portions 45B. In the structural unit 10B of the second modified example, neither the outer peripheral surface of the first ring gear 90 nor the inner peripheral surface of the first housing element 40 is a crowned surface. In this structure, the first housing element 40B supports the first ring gear 90B so as to enable movement so that the axis of the first ring gear 90B may incline in respect to the axis of the first housing element 40B.

Figure 20:
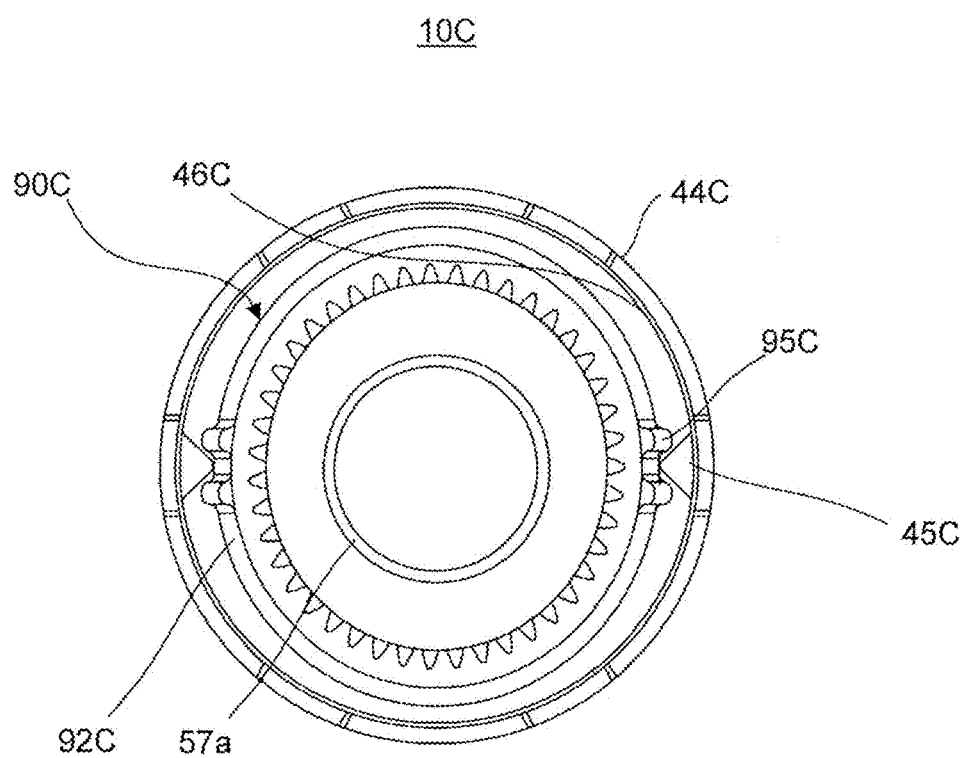
FIG. 20 is a front view of a structural unit, viewing a third modified example of a structural unit according to an embodiment according to the present disclosure from one side in the axial direction.

Comparing, to the structural unit 10, the structural unit 10C of a third modified example of a structural unit, depicted in FIG. 20 through FIG. 22, the shapes of the second raised portions 45 of the first housing element (housing) 40 and the shapes of the first raised portions 95 of the first ring gear 90 are different.

The first ring gear 90C has an outer peripheral surface 92C that extends in the axial direction. The outer peripheral surface 92C is a crowned surface that, as with the first ring gear 90, protrudes in the radial direction. The outer peripheral surface 92C protrudes in the outer radial direction, and a pair of first raised portions 95C is formed extending in the axial direction.

The first raised portions 95C, as depicted in FIG. 22, have triangular cross-sectional shapes, with sizes that are the same regardless of the location in the axial direction, and are formed with the same heights from the outer peripheral surface 92C. The pairs of first raised portions 95C are provided parallel to each other on the outer peripheral surface 92C.

On the other hand, the first housing element 40C is disposed so as to encompass the first ring gear 90C, where the first housing element 40C has an inner peripheral surface 46C of a first cylinder 44C that is disposed facing, with a gap therefrom, the outer peripheral surface 92C of the first ring gear 90C. The inner peripheral surface 46C is a crowned surface of a recessed shape that is recessed in the outer radial direction, the same as with the inner peripheral surface 46, and corresponds to the outer peripheral surface 92C.

The inner peripheral surface 46C, as with the structure of the inner peripheral surface 46, has second raised portion 45C that extend in the axial direction. The second raised portions 45C are provided on the crowned surface so as to extend in the axial direction.

The second raised portions 45C are inserted between pairs of first raised portions 95C in the first ring gear 90C, to make point contact or a linear contact in the circumferential direction.

As depicted in FIG. 21, the second raised portions 45C have triangular cross-sections that are perpendicular to the axial direction, that is, are ribs with triangular cross-sectional shapes, and are formed so as to be wider in the axial-direction center parts. Through this, the second raised portions 45C make contact first at the center parts thereof, which bulge in the circumferential direction, when contacting the first raised portions 95C in the circumferential direction.

Moreover, when the second raised portions 45C enter in between the pairs of first raised portions 95C, point contacts or linear contacts are made with the first raised portions 95C at the center parts thereof. This makes it possible to improve even further the robustness in respect to imprecise alignment, through the ability to cause the first ring gear 90C and the planetary gears 72 to mesh suitably, even in a state wherein the axis of the first ring gear 90C is inclined in respect to the axis of the first housing element 40.

Note that with the structural units 10, 10A, and 10C of the embodiment and the first and third modified examples, set forth above, the outer peripheral surfaces 92, 92A, and 92C of the first ring gears 90, 90A, and 90C, and the inner peripheral surfaces 46, 46A, and 46C of the first housing elements 40, 40A, and 40C were all crowned surfaces. This makes it possible to constrain movement of the first ring gear in the radial direction toward the housing space of the first housing element through adjusting the looseness with which they are fit together, that is, the size of the gap.

Figure 23:
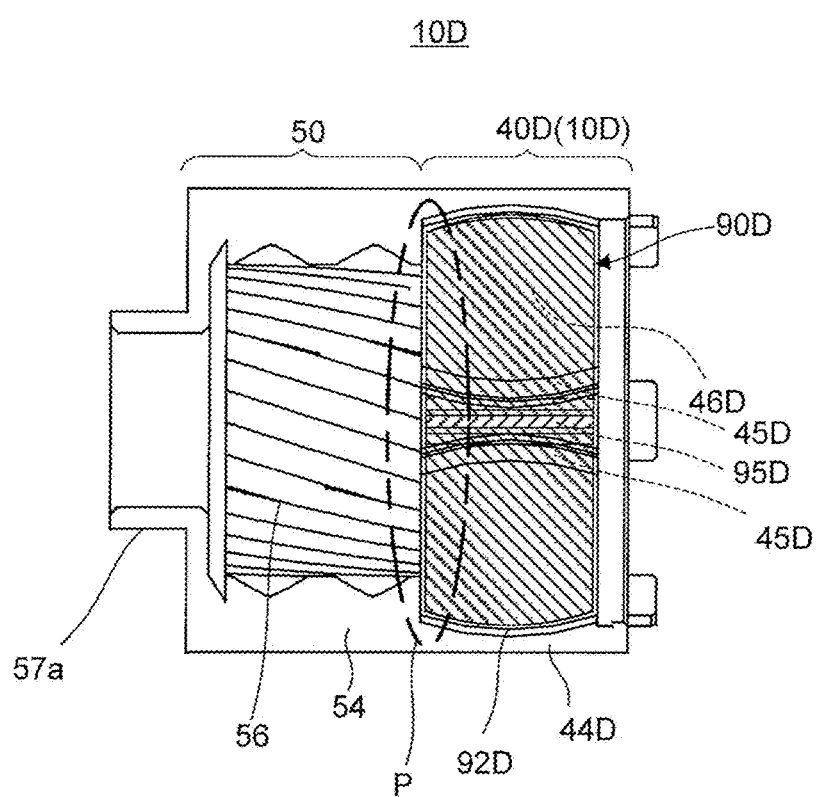
FIG. 23 is a longitudinal sectional drawing, sectioned along the axial direction, of a structural unit according to a fourth modified example.

For example, in the structural unit 10D of a fourth modified example, depicted in FIG. 23, the inner peripheral surface 46D of a first housing element 40D and the outer peripheral surface 92D a first ring gear 90D (which is depicted by hatching, for convenience) are crowned surfaces, and the first ring gear 90D is contained within the first housing element 40D. Through this, through having both be crowned surfaces, the first ring gear 90D may be limited in its movement in the axial direction, including to the other side (the +X side), in respect to the first housing element 40D. Note that the first cylinder 44D, the second raised portions 45D, and the first raised portions 95D, have the same structures and functions as, for example, the first cylinder 44, the second raised portions 45, and the first raised portions 95.

Because of this, in, for example, the first ring gear there is no need to provide raised portions, on the opening end face on the other side, indicated by P, to contact the end face of the housing within the housing. Note that the structural units 10A through 10D of the first through fourth modified examples, described above, can each replace the structural unit 10, to produce a planetary gear apparatus 3 and an actuator 1 that incorporates the planetary gear apparatus 3.

As depicted in this way in structural units 10 and 10A through 10D, the outer peripheral surface of the first ring gear (ring gear) and/or the inner peripheral surface of the first housing element (housing) has a crowned surface. Moreover, the first raised portions of the outer peripheral surface and/or the second raised portions of the inner peripheral surface may be of any shape insofar as the part that makes contact, in the circumferential direction, with the other is structured as a bowed part of a shape that bulges so as to make point contact or line contact in the circumferential direction. Through this contact, in a state wherein movement of the first ring gear in the circumferential direction within the first housing element is limited, the first ring gear is enclosed by the first housing element, without a loss of functionality as the first ring gear in the gear mechanism, even in a state wherein the axis of the first ring gear is inclined in respect to the axis of the first housing element.

Moreover, while the explanation was for a case wherein the housing main unit 4 was used as a portion of the planetary gear apparatus, the application is not limited thereto, but may instead be used as a portion of another gear mechanism.

Embodiments according to the present disclosure have been explained above. Note that the explanation set forth above demonstrates suitable embodiments of the present disclosure, but the scope of the present disclosure is by no means limited thereto. That is, the explanations regarding the structures of the apparatus, and the shapes of various parts, described above, are examples, and obviously a variety of modifications and additions can be made to these examples within the scope of the present disclosure.

POTENTIAL FOR USE IN INDUSTRY

The planetary gear apparatus and actuator according the present disclosure can be built into various mechanical equipment.

The invention claimed is:
1. A structural unit comprising:
  a ring gear having an outer peripheral surface that extends in the axial direction, wherein a first raised portion is formed on said outer peripheral surface; and
  a housing having an inner peripheral surface that is provided facing, and with a gap from the outer peripheral surface of the ring gear, wherein a second raised portion is formed on said inner peripheral surface, and wherein movement of the ring gear in the circumferential direction is limited by linear contact or point contact between the first raised portion and the second raised portion, wherein:
  the outer peripheral surface and/or the inner peripheral surface is a surface of a crowned shape that is bowed in the outer radial direction, wherein the surface of the crowned shape is the inner peripheral surface, which is recessed in the outer radial direction; and
  wherein the first raised portion of the outer peripheral surface is formed so as to move along the inner peripheral surface and contact the second raised portion in the circumferential direction.

2. A structural unit as set forth in claim 1, wherein:
  the housing supports the ring gear movably so that the axis of the ring gear inclines in respect to the axis of the housing through linear contact or point contact between the first raised portion and the second raised portion.

3. A structural unit as set forth in claim 1, wherein:
  the outer peripheral surface and the inner peripheral surface are surfaces of crowned shapes that are each bowed in the outer radial direction.

4. A structural unit as set forth in claim 1, wherein:
  the first raised portion and/or the second raised portion extends in the axial direction and an axial-direction center part is bowed into a shape that bulges in the circumferential direction so as to make point contact or linear contact with the raised portion of the other.

5. A planetary gear apparatus comprising:
  a structural unit as set forth in claim 1;
  one or a plurality of planetary gears that mesh with the ring gear;

a sun gear, positioned at the center of the one or plurality of planetary gears and that meshes with the one or plurality of planetary gears; and a carrier that supports the one or plurality of planetary gears rotatably.

6. A planetary gear apparatus as set forth in claim 5, further comprising:

a second sun gear that rotates in accordance with rotation of the carrier;

one or a plurality of second planetary gears, disposed around the second sun gear and meshing with the second sun gear;

a second carrier that supports rotatably the one or plurality of second planetary gears; and a second housing, wherein are formed, on the inner peripheral surface thereof, inner teeth that mesh with the one or plurality of second planetary gears, wherein:

the housing is formed as a single unit with the second housing.

7. An actuator, comprising:

a planetary gear apparatus as set forth in claim 5; and a motor that is connected to the planetary gear apparatus, for driving the planetary gear apparatus.

8. A structural unit comprising:

a ring gear having an outer peripheral surface that extends in the axial direction, wherein a first raised portion is formed on said outer peripheral surface; and a housing having an inner peripheral surface that is provided facing, and with a gap from the outer peripheral surface of the ring gear, wherein a second raised portion is formed on said inner peripheral surface, and wherein movement of the ring gear in the circumferential direction is limited by linear contact or point contact between the first raised portion and the second raised portion, wherein the outer peripheral surface and/or the inner peripheral surface is a surface of a crowned shape that is bowed in the outer radial direction, and wherein the first raised portion and/or the second raised portion extends in the axial direction and an axial-direction center part is bowed into a shape that bulges in the circumferential direction so as to make point contact or linear contact with the raised portion of the other.

9. A structural unit as set forth in claim 8, wherein:

the housing supports the ring gear movably so that the axis of the ring gear inclines in respect to the axis of the housing through linear contact or point contact between the first raised portion and the second raised portion.

10. A structural unit as set forth in claim 8, wherein:

the outer peripheral surface and the inner peripheral surface are surfaces of crowned shapes that are each bowed in the outer radial direction.

11. A structural unit as set forth in claim 8, wherein:

the surface of the crowned shape is the inner peripheral surface, which is recessed in the outer radial direction; and the first raised portion of the outer peripheral surface is formed so as to move along the inner peripheral surface and contact the second raised portion in the circumferential direction.

12. A planetary gear apparatus comprising:

a structural unit as set forth in claim 8;

one or a plurality of planetary gears that mesh with the ring gear;

a sun gear, positioned at the center of the one or plurality of planetary gears and that meshes with the one or plurality of planetary gears; and a carrier that supports the one or plurality of planetary gears rotatably.

13. An actuator, comprising:

a planetary gear apparatus as set forth in claim 12; and a motor that is connected to the planetary gear apparatus, for driving the planetary gear apparatus.

14. A structural unit comprising:

a ring gear having an outer peripheral surface that extends in the axial direction, wherein a first raised portion is formed on said outer peripheral surface;

a housing having an inner peripheral surface that is provided facing, and with a gap from the outer peripheral surface of the ring gear, wherein a second raised portion is formed on said inner peripheral surface, and wherein movement of the ring gear in the circumferential direction is limited by linear contact or point contact between the first raised portion and the second raised portion, wherein the outer peripheral surface and/or the inner peripheral surface is a surface of a crowned shape that is bowed in the outer radial direction;

one or a plurality of planetary gears that mesh with the ring gear;

a sun gear, positioned at the center of the one or plurality of planetary gears and that meshes with the one or plurality of planetary gears;

a carrier that supports the one or plurality of planetary gears rotatably;

a second sun gear that rotates in accordance with rotation of the carrier;

one or a plurality of second planetary gears, disposed around the second sun gear and meshing with the second sun gear;

a second carrier that supports rotatably the one or plurality of second planetary gears; and a second housing, wherein are formed, on the inner peripheral surface thereof, inner teeth that mesh with the one or plurality of second planetary gears, wherein the housing is formed as a single unit with the second housing.

15. A structural unit as set forth in claim 14, wherein:

the housing supports the ring gear movably so that the axis of the ring gear inclines in respect to the axis of the housing through linear contact or point contact between the first raised portion and the second raised portion.

16. A structural unit as set forth in claim 14, wherein:

the outer peripheral surface and the inner peripheral surface are surfaces of crowned shapes that are each bowed in the outer radial direction.

17. A structural unit as set forth in claim 14, wherein:

the surface of the crowned shape is the inner peripheral surface, which is recessed in the outer radial direction; and the first raised portion of the outer peripheral surface is formed so as to move along the inner peripheral surface and contact the second raised portion in the circumferential direction.

18. An actuator, comprising:

a planetary gear apparatus as set forth in claim 14; and a motor that is connected to the planetary gear apparatus, for driving the planetary gear apparatus.

\* \* \* \* \*